Jan. 10, 1961 EIICHI GOTO ET AL 2,968,028

MULTI-SIGNALS CONTROLLED SELECTING SYSTEMS

Filed June 18, 1957 5 Sheets-Sheet 2

MULTI-SIGNALS CONTROLLED SELECTING SYSTEMS

Filed June 18, 1957 5 Sheets-Sheet 3

Jan. 10, 1961 EIICHI GOTO ET AL 2,968,028

MULTI-SIGNALS CONTROLLED SELECTING SYSTEMS

Filed June 18, 1957 5 Sheets-Sheet 4

United States Patent Office 2,968,028

Patented Jan. 10, 1961

2,968,028

MULTI-SIGNALS CONTROLLED SELECTING SYSTEMS

Eiichi Goto and Hiroshi Yamada, Tokyo, Japan, assignors to Fuje Tsushinki Seizo Kabushiki Kaisha, Kawasaki, Japan, a corporation of Japan Filed June 18, 1957, Ser. No. 666,449

Claims priority, application Japan June 21, 1956

7 Claims. (Cl. 340—174)

This invention relates to an electrical system for selecting one out of a plurality of output circuits by combination of a plurality of input signals, such combined signals being concentrated and fed into said selected output.

According to the invention, each input signal has one and the same frequency $f$, while such input signals, respectively, represent binary "zero" or "one," that is to say, each signal has either a zero phase position or a 180° phase position.

In practicing the present invention, parameter-excited resonators as disclosed in Eiichi Goto's United States patent application filed on May 16, 1955, Serial No. 508,668, are utilized, such resonators being called "parametrons."

Detailed descriptions on parametrons are given in the above-identified prior application, and summarized in the co-pending patent application of October 17, 1956, Serial No. 616,565, to which we refer. In the latter co-pending application, we established certain conventions for the purpose of simplifying the illustration of parametrons, and such conventions are followed also in the present application. Accordingly, a parametron is represented by a single circle in the drawings. It is to be noted that each parametron has a pair of exciting terminals but these are not shown in the drawings according to the convention, only input or control and output terminals being shown by corresponding lines.

An object of the present invention is to provide an electrical selecting system whereby a plurality of binary input signal energies are concentrated into one selected output circuit.

Another object of the invention is to provide a memory selecting circuit in which input signals having either zero phase position or 180° phase position are changed in frequency with their respective phase positions unchanged, and also specify a memory address.

A further object of the invention is to provide a binary selecting circuit or the like, reliable in operation with substantially no energy loss.

A further object of the invention is to provide a selecting circuit of the kind specified, with the least number of vacuum tubes, by utilization of parametrons or equivalent cored coil devices, which circuit is low in cost, long in useful life, and stable in operation.

There are other objects and particularities of the present invention, which will be obvious from the following detailed descriptions and appended claims, with reference to the accompanying drawings, in which:

Figure 6:
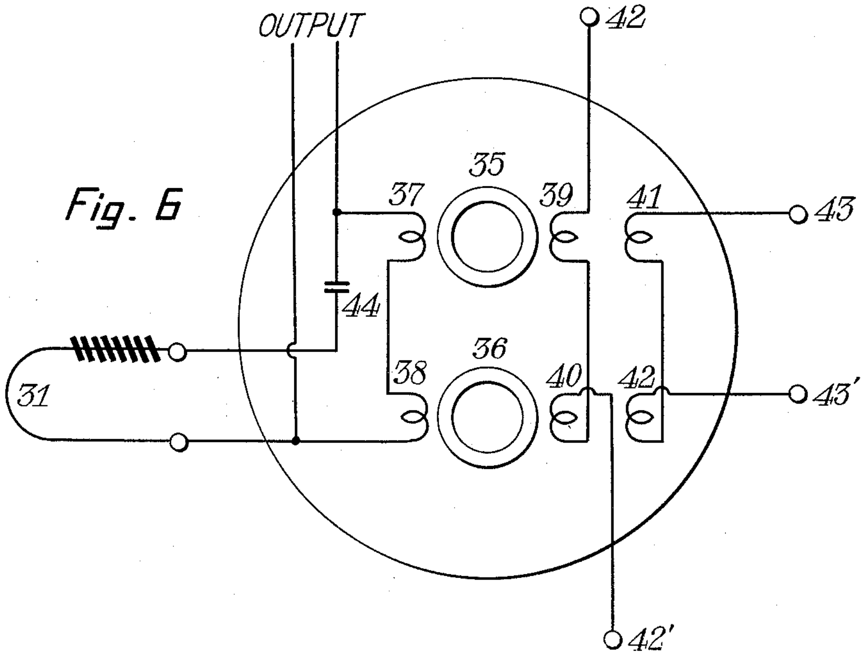
Figure 5:
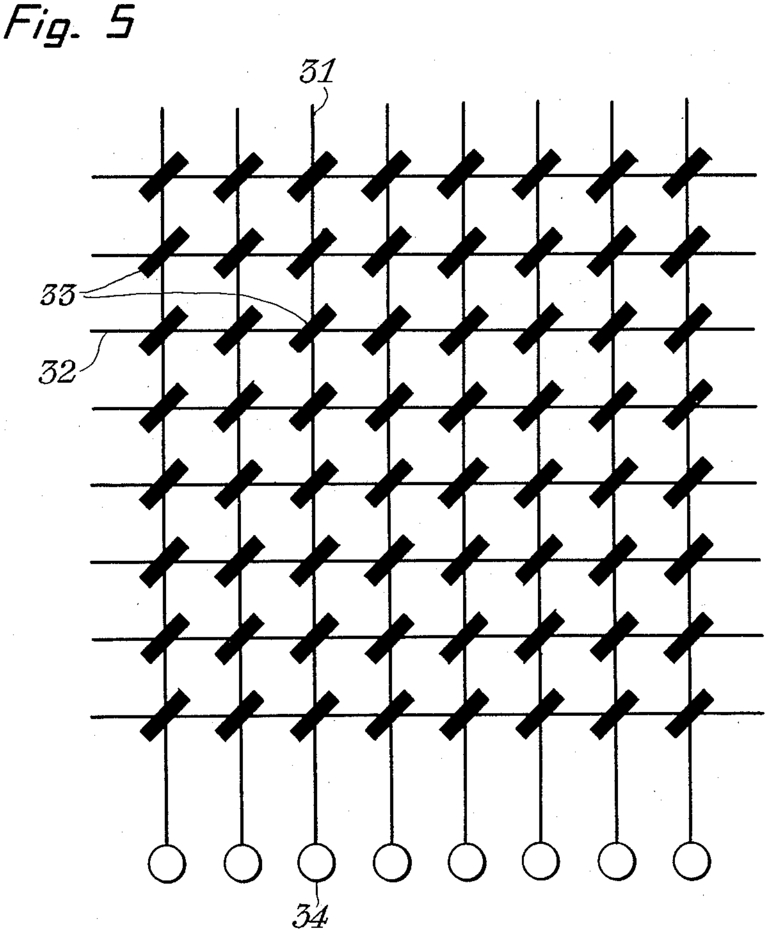

Fig. 5 schematically shows a memory circuit which may be controlled by a selecting circuit embodying the invention; and Fig. 6 is a somewhat detailed schematic diagram of an elemental portion of the circuit shown in Fig. 5.

Figure 1:
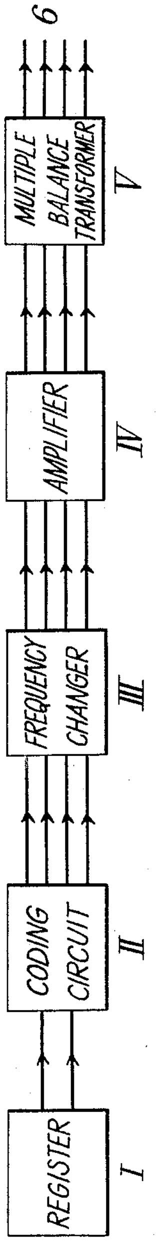
Fig. 1 is a block diagram showing one embodiment of the invention.

Referring to Fig. 1, the system comprises a register I, a coding circuit II, a frequency changing circuit III, an amplifier IV, and a multiple balance transformer V, all connected tandem in the order mentioned. The multiple balance transformer V has a plurality of output terminals 6, one of which is selected by a plurality of input signals derived from the register I, and the combined input energies concentrated into one are withdrawn from the selected output.

Figure 2:
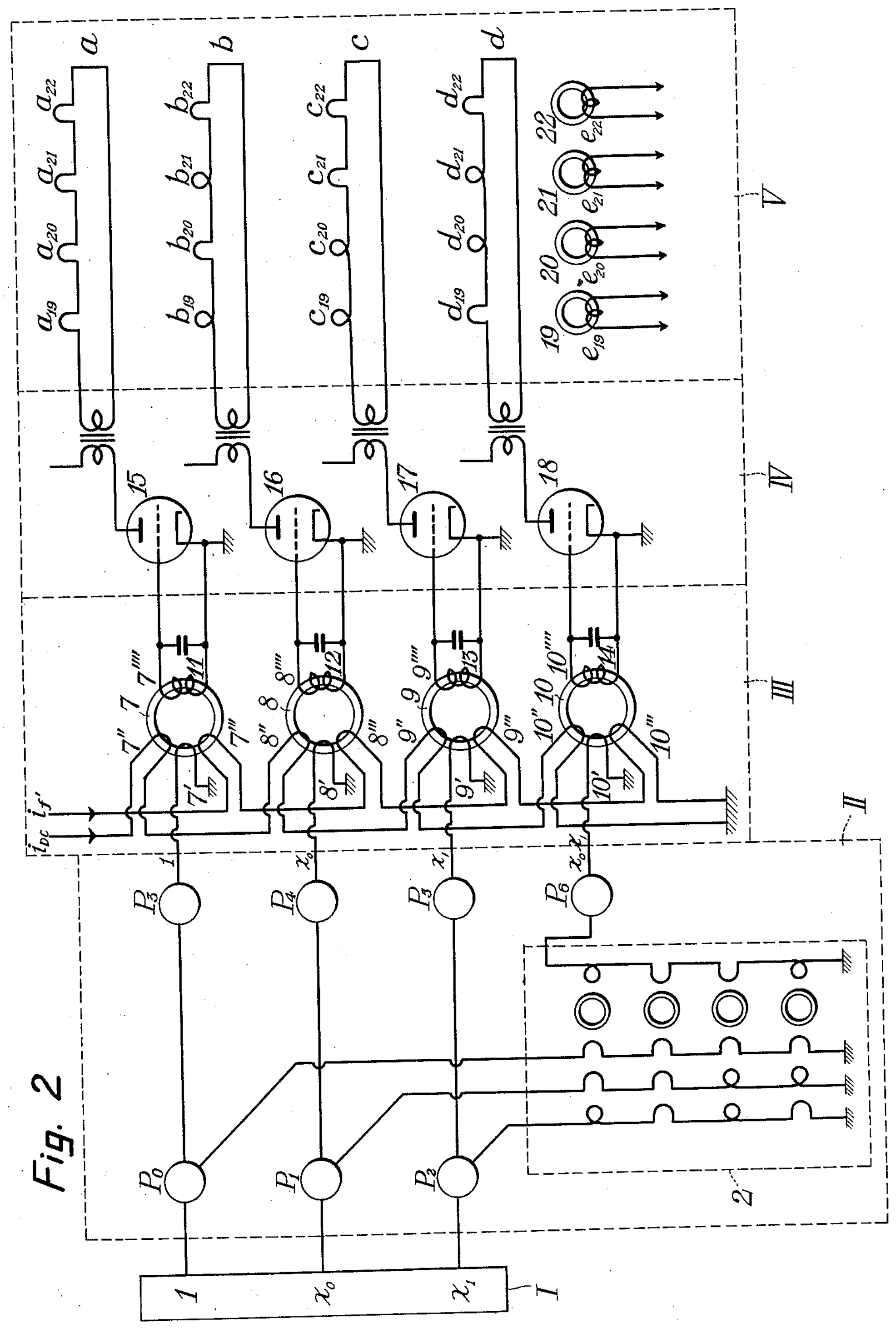
Fig. 2 is a schematic diagram of the embodiment shown in Fig. 1.

Fig. 2 schematically shows the circuits comprising the system shown in Fig. 1. The register I, per se, is known and may comprise a plurality of cascaded stages, the last one of which supplies binary signals 1 (constant), $x_0$ and $x_1$ to the coding circuit II in which the required number of signals are formed for the multiple balance transformer V to be described hereinafter.

The three signals 1, $x_0$ and $x_1$ are applied to parametrons $P_0$, $P_1$ and $P_2$, respectively, in the coding circuit II, and passed through second parametrons $P_3$, $P_4$ and $P_5$, respectively, to the frequency changer III. At the same time, another output of each first parametron, $P_0$, $P_1$, $P_2$, is fed into a triple balance modulator 2 forming a part of the coding circuit II, in which modulator a signal $x_0$, $x_1$ is formed and supplied to the frequency changer III through a parametron $P_6$. In the present application, zero phase voltages and currents are represented by "—1," and $\pi$ or 180° phase voltages and currents by "+1," respectively.

The triple balance modulator 2 may be of any suitable form, but in the form illustrated in Fig. 2, comprises 4 magnetic cores represented by double circles, respectively, with four coils each inductively associated therewith. The cores are designed to operate in the non-linear portions of the B—H curves. Respective ones of the coils on respective magnetic cores are connected in series to form four series groups of coils or four windings, three of which constitute input windings to be energized by the outputs from parametrons $P_0$ $P_1$, and $P_2$, respectively, while the fourth constitutes an output winding connected to parametron $P_6$. The coils are so orientated on respective cores that no voltage is induced in the output winding, in the case that the cores operate on the linear portions of the B—H curves. As the matter of fact, however, all the cores operate on the non-linear portions of the B—H curves, a voltage appears at the output terminal and is applied to parametron $P_6$, which voltage has a polarity depending upon the currents flowing through the three input windings. The output phases are so designed as to be shown in the following table:

*Table 1*

| Input Current | | | Output voltage—4th winding |
|---|---|---|---|
| 1st winding | 2nd winding | 3rd winding | |
| −1 | −1 | +1 | +1 |
| −1 | +1 | +1 | −1 |
| +1 | −1 | +1 | −1 |
| +1 | +1 | +1 | +1 |

The frequency changer III comprises four magnetic cores of non-linear characteristics 7, 8, 9 and 10 formed by ferrite or similar material, having coils 7′, 8′, 9′ and 10′, respectively, wound thereon, through which coils the coded four output signals, 1, $x_0$, $x_1$ and $x_0$, $x_1$, from the coding circuit II are supplied to flow, respectively. The cores 7, 8, 9 and 10, respectively, have second coils 7″, 8″, 9″ and 10″ inductively associated therewith and connected in series circuit relation with each other, through which direct current $i_{DC}$ is supplied to flow, and inductively associated third coils 7''', 8''', 9''' and 10''' also connected in series, through which current having a frequency $f'$ is supplied to flow. The cores 7, 8, 9 and 10 also have output coils 7''', 8''', 9''' and 10''', respectively, inductively coupled with corresponding three primary coils. Each output current contains $i_f i_f'$ component which may be represented as follows:

$$i_f i_{f'} = I_f \sin(2\pi ft + \theta) I_{f'} \sin 2\pi f't$$
$$= \tfrac{1}{2} I_f I_{f'} [\cos\{2\pi(f - f')t + \theta\} - \cos\{2\pi(f + f')t + \theta\}]$$

where $\theta$ represents the phase difference, or 0 or $\pi$ for parametrons. Thus, two frequencies $(f-f')$ and $(f+f')$ are obtained, and if $f'$ current is of a definite phase angle, the phase angle (0 or $\pi$) of $f$ current is maintained. Therefore, the necessary one $f$ or $f'$ can be derived out by passing the output currents through respective tuning circuits 11, 12, 13 and 14.

The amplifier IV comprises four amplifier tubes 15, 16, 17 and 18 for amplifying the respective outputs of four tuning circuits 11, 12, 13 and 14, and the amplified outputs are supplied to the multiple balance transformer V respectively through coupling transformers or equivalent means.

The multiple balance transformer V comprises four input windings $a$, $b$, $c$ and $d$. Each input winding, for example $a$, is formed by four coils $a_{19}$, $a_{20}$, $a_{21}$ and $a_{22}$ connected in series relation with each other, and respectively wound on four magnetic cores 19, 20, 21 and 22. Besides four input coils, such as $a_{19}$, $b_{19}$, $c_{19}$ and $d_{19}$, each core, for example 19, is provided with an output winding $e_{19}$, from which, when it is selected, an output is delivered. Among the 16 coils of the four groups of series connected input coils, coils $b_{19}$, $c_{19}$, $c_{20}$, $d_{20}$, $b_{21}$ and $d_{21}$ are wound on respective cores 19, 20 and 21 in opposite polarities with respect to the remaining coils. The magnetic cores are designed to operate on the linear portions of the B—H curves. As a result, when the four currents flowing through the respective input winding $a$, $b$, $c$ and $d$, are in phase with each other, four input coils on each of cores 19, 20 and 21 produce fluxes which cancel with each other, while opposite phase currents flowing through two same polarity coils on each core 19, 20, 21, 22 produce fluxes which cancel with each other. By virtue of such mutual cancellation, input energies are concentrated in selected one of four outputs $e_1$, $e_{20}$, $e_{21}$ and $e_{22}$, as to be described hereinafter.

The output signals of the registor I are $x_0$, $x_1$ and 1 (constant), and for every values of $x_0$ and $x_1$, the following combinations and outputs are obtained:

*Table II*

| Input | | | Coding circuit output | | | | Frequency changer output | | | | Multiple balance transformer output | | | |
|---|---|---|---|---|---|---|---|---|---|---|---|---|---|---|
| 1 | $x_0$ | $x_1$ | $P_3$ | $P_4$ | $P_5$ | $P_6$ | 11 | 12 | 13 | 14 | $e_{19}$ | $e_{20}$ | $e_{21}$ | $e_{22}$ |
| +1 | −1 | −1 | +1 | −1 | −1 | +1 | +1 | −1 | −1 | +1 | 4 | 0 | 0 | 0 |
| +1 | +1 | −1 | +1 | +1 | −1 | −1 | +1 | +1 | −1 | −1 | 0 | 4 | 0 | 0 |
| +1 | −1 | +1 | +1 | −1 | +1 | −1 | +1 | −1 | +1 | −1 | 0 | 0 | 4 | 0 |
| +1 | +1 | +1 | +1 | +1 | +1 | +1 | +1 | +1 | +1 | +1 | 0 | 0 | 0 | 4 |
| frequency $f$ | | | frequency $f$ | | | | frequency $f \pm f'$ | | | | frequency $f \pm f'$ | | | |

If $x_0 = -1$ and $x_1 = -1$ are assumed, the four outputs of the coding circuit II are +1, $x_0 = +1$, $x_1 = -1$ and $x_0 x_1 = -1$. In the frequency changer III, only the frequencies are changed, but not the phase positions, the same four signals are, after amplification, applied to the multiple balance transformer V. These signal currents flowing through the primary coils produce the following magnetic signals and outputs.

| | $a_{19}$ | $b_{19}$ | $c_{19}$ | $d_{19}$ | $e_{19}$ | $a_{20}$ | $b_{20}$ | $c_{20}$ | $d_{20}$ | $e_{20}$ |
|---|---|---|---|---|---|---|---|---|---|---|
| current | +1 | +1 | −1 | −1 | ------ | +1 | +1 | −1 | −1 | ------ |
| flux | +1 | −1 | +1 | −1 | 0 | +1 | +1 | +1 | +1 | 4 |
| | $a_{21}$ | $b_{21}$ | $c_{21}$ | $d_{21}$ | $e_{21}$ | $a_{22}$ | $b_{22}$ | $c_{22}$ | $d_{22}$ | $e_{22}$ |
| current | +1 | +1 | −1 | −1 | ------ | +1 | +1 | −1 | −1 | −1 |
| flux | +1 | −1 | −1 | +1 | 0 | +1 | +1 | −1 | −1 | 0 |

Thus, four times concentrated energy is selectively derived from the output $e_{20}$ only. By appropriate combinations of inputs $x_0$ and $x_1$, as shown in Table II, appropriate one of four outputs $e_{19}$, $e_{20}$, $e_{21}$ and $e_{22}$ is selected to deliver four times concentrated energy which may be utilized for any purpose, such as for operating associated telephone receiver, counting circuit or the like. The purpose of the frequency change will be made clear hereinafter.

Figure 3:
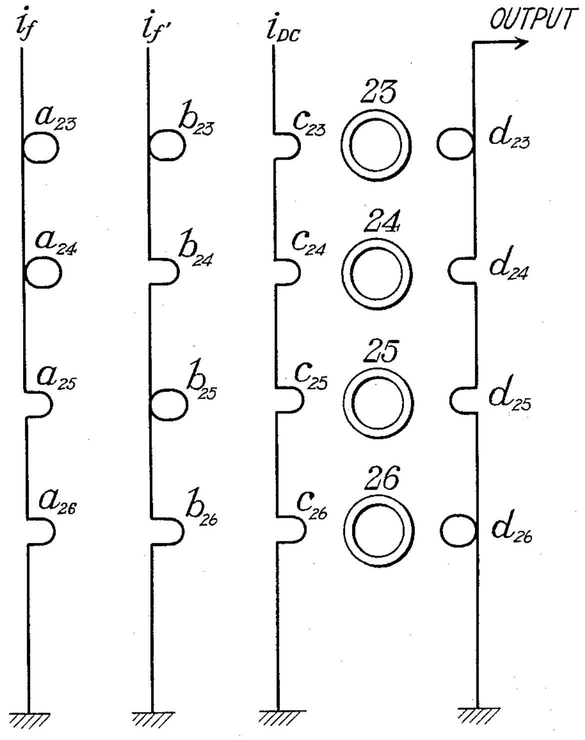
Fig. 3 is a schematic diagram showing a modification of the frequency changing circuit in Fig. 1.

Fig. 3 shows a modified form of the frequency changer. The modified frequency changer comprises four magnetic cores 23, 24, 25 and 26 for one signal. The cores are respectively associated with three input coils $a_{23}$, $b_{23}$, $c_{23}$; $a_{24}$, $b_{24}$, $c_{24}$; $a_{25}$, $b_{25}$, $c_{25}$; $a_{26}$, $b_{26}$, $c_{26}$; and an ouput coil $d_{23}$, $d_{24}$, $d_{25}$, $d_{26}$. Coils $a_{23}$, $a_{24}$, $a_{25}$ and $a_{26}$ are connected in series with each other, and energized by $f$ frequency signal current $i_f$. Coils $b_{23}$, $b_{24}$, $b_{25}$ and $b_{26}$ are connected in series and energized by $f'$ current $i_f'$, while coils $c_{23}$, $c_{24}$, $c_{25}$ and $c_{26}$ connected in series with each other are energized by direct current $i_{DC}$. Among the 16 coils, $a_{23}$, $a_{24}$, $b_{23}$, $b_{25}$, $d_{23}$ and $d_{26}$ are wound in opposite directions with respect to the remaining ones. The output is derived from the series connected 4 output coils $d_{23}$ to $d_{26}$. With such an arrangement, the effect of magnetic linkages between primary coils as observed in the arrangement shown in Fig. 2 is eliminated, and the filter circuit design is remarkably simplified.

In the frequency changer shown in Fig. 2, if the currents $i_f$, $i_{f'}$ flowing through the primary winding are assumed to be as follows, $$i_f = I_f \sin(2\pi ft + \theta f)$$
$$i_{f'} = I_{f'} \sin(2\pi f't + \theta' f)$$

then the voltage appearing in the output winding is represented by the following equation:

$$e = a_1(i_f + i_{f'}) + a_2(i_f + i_{f'})^2 + a_3(i_f + i_{f'})^3 + \ldots$$

where $a_1$, $a_2$, $a_3$ . . . represent modulation coefficients. The above equation means that voltages which have frequencies $f$, $f'$, $f-f'$, $f+f'$, $2f$, $2f'$, $3f$, $3f'$, and so on appear in the output winding. Hence, when the frequencies $f+f'$ is necessary, the other frequencies must be attenuated.

In the frequency changer shown in Fig. 3, in which only a part of a circuit for one coded signal is shown, voltage $e_{23}$, $e_{24}$, $e_{25}$, $e_{26}$ appearing in cores 23, 24, 25, 26 respectively may be represented by the following equations:

$$e_{23}=a_1(-i_f-i_{f'})+a_2(-i_f-i_{f'})^2+a_3(-i_f-i_{f'})^3+ \dots$$
$$e_{24}=a_1(-i_f+i_{f'})+a_2(-i_f+i_{f'})^2+a_3(-i_f+i_{f'})^3+ \dots$$
$$e_{25}=a_1(i_f-i_{f'})+a_2(i_f-i_{f'})+a_3(i_f-i_{f'})^3+ \dots$$
$$e_{26}=a_1(i_f+i_{f'})+a_2(i_f+i_{f'})+a_3(i_f+i_{f'})^3+ \dots$$

Accordingly, the output voltage $e$ in frequency changer is:

$$\begin{aligned} e &= e_{23}-e_{24}-e_{25}+e_{26} \\ &= 2a_2(i_f+i_{f'})^2-2a_2(i_f-i_{f'})^2+ \dots \\ &= 4a2i_fi_{f'}+ \dots \\ &= 4a_2I_fI_{f'} \sin(2\pi ft+\theta f) \sin(2\pi f't+\theta f') \\ &= 2a_2I_fI_{f'}[\cos\{2\pi(f-f')t+\theta f-\theta f'\} \\ &\qquad -\cos\{2\pi(f+f')t+\theta f+\theta f'\}] \end{aligned}$$

In this case, output winding is not comprised of components of frequencies, $f$, $f'$, $2f'$, $3f$, $3f'$, so the filter construction is simple.

Figure 4:
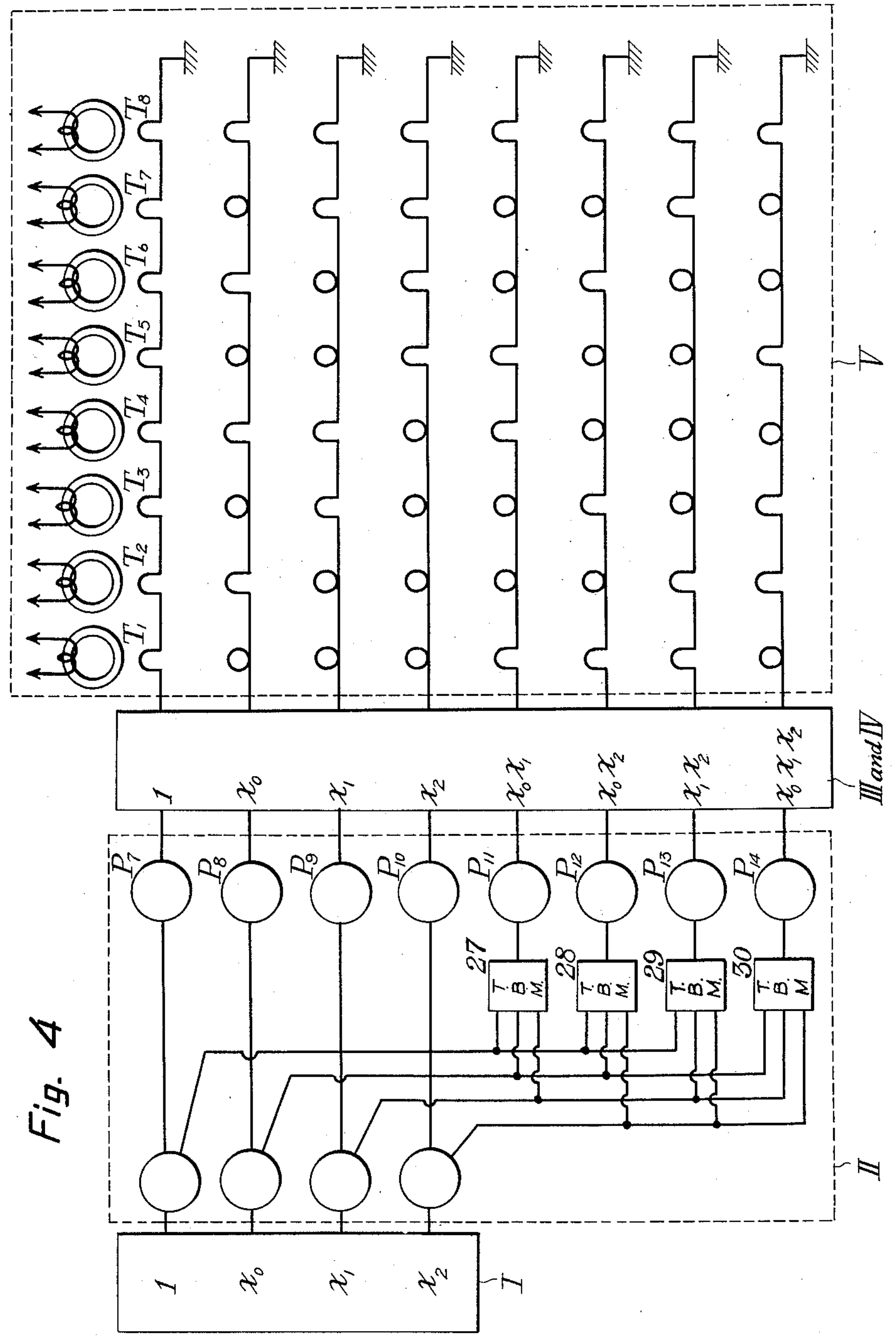
Fig. 4 is a partly block and partly schematic diagram of another embodiment of the invention.

In Fig. 4, another embodiment of the invention is shown with 4 input signals 1, $x_0$, $x_1$ and $x_2$, the output signals of register I. In this embodiment, the coding circuit II comprises four triple balance modulator (T.B.M.) 27, 28, 29 and 30, which are of similar construction with triple balance modulator 2 in Fig. 2, and are respectively designed to deliver signals $x_0x_1$, $x_0x_2$, $x_1x_2$ and $x_0x_1x_2$. Thus, 8 outputs 1, $x_0$, $x_1$, $x_2$, $x_0x_1$, $x_0x_2$, $x_1x_2$ and $x_0x_1x_2$ are obtained from the coding circuit II through parametrons $P_7$, $P_8$, $P_9$, $P_{10}$, $P_{11}$, $P_{12}$, $P_{13}$, and $P_{14}$, respectively. The multiple balance transformer V comprises 8 transformers $T_1$ to $T_8$, each provided with 8 input coils and an output coil. Every eight primary coils, one for each transformer, are connected in series with each other and energized by 8 input signals 1, $x_0$, $x_1$, $x_2$, $x_0x_1$, $x_0x_2$, $x_1x_2$ and $x_0x_1x_2$, respectively, from the amplifier IV, in a manner similar to that in Fig. 2. The primary coils are selectively orientated so that eight times concentrated output energy is obtained from the selected one of the eight transformers for an appropriate combination of input signals as shown in Table III.

nitude, while when $f$ frequency current has a $\pi$ phase, the negative peak magnitude of $i_{f+}i_{f/2}$ is larger than its positive peak. This is utilized for writing binary number "zero" or "one" in a magnetic core. For reading out the binary number thus written in, $f/2$ frequency current is supplied to the primary coil on the core, and $f$ frequency current is induced in the secondary coil on the same core, which secondary current has a particular phase representing binary number "zero" or "one."

Fig. 5 shows such a memory device. One array of parallel conducting wires 31 and the second array of parallel wires 32 intersecting the first array wires 31 are magnetically coupled together by magnetic cores 33 disposed at each crossing of wires 31 and 32. For writing in operation, $f$ frequency current is selectively passed through wires 31, while $f/2$ frequency current is selectively passed through wires 32, and the core at a selected crossing is written in.

For reading out, a current of $f/2$ frequency is supplied to one of the horizontal wires 32, the remaining wires 32 being deenergized, the memory contents of 8 magnetic cores 33 through which the particular wire 32 passes are read out into the vertical wires 31. $f/2$ frequency current may be passed through any one of the horizontal wires in order to select the magnetic cores. For selection of the horizontal wires, one of the outputs from the multiple balance transformer V in Fig. 4 may be utilized, by choosing $f'$ so as to be $f-f'=f/2$ or $f'-f=f/2$.

A parametron 34 may be associated with each vertical wire 31 for amplifying the read out signal. Referring to Fig. 6, each parametron 34 comprises a pair of toroidal magnetic cores 35 and 36 of ferrite, for example. Three coils 37, 39 and 41 are wound on the core 35, and three coils 38, 40 and 42 on the core 36. Coils 37 and 38 form a tuning circuit together with a condensor 44, which tuning circuit includes a vertical wire 31. Coils 39 and 40 are connected in series between terminals 42 and 42' and direct current bias is applied thereto. Coils 41 and 42 are connected in series between terminals 43 and 43' across which one output of the multiple balance transformer V may be applied for excitation.

When $f'$ is selected equal to $f$ or $3f$, that is to say, $f'+f=2f$ or $f'-f=2f$, a parametron 34 will oscillate when the corresponding output of the multiple balance transformer V coupled thereto is selected for effecting writing in or reading out of the memory device.

Thus, according to the present invention, the selected magnetic core 33 only located at the crossing of a selected

*Table III*

| Input | | | | Coding Circuit Output | | | | | | | | Multiple Balance Transformer Output | | | | | | | |
|---|---|---|---|---|---|---|---|---|---|---|---|---|---|---|---|---|---|---|---|
| 1 | $x_0$ | $x_1$ | $x_2$ | $P_7$ | $P_8$ | $P_9$ | $P_{10}$ | $P_{11}$ | $P_{12}$ | $P_{13}$ | $P_{14}$ | $T_1$ | $T_2$ | $T_3$ | $T_4$ | $T_5$ | $T_6$ | $T_7$ | $T_8$ |
| +1 | −1 | −1 | −1 | +1 | −1 | −1 | −1 | +1 | +1 | +1 | −1 | 8 | 0 | 0 | 0 | 0 | 0 | 0 | 0 |
| +1 | +1 | −1 | −1 | +1 | +1 | −1 | −1 | −1 | −1 | +1 | +1 | 0 | 8 | 0 | 0 | 0 | 0 | 0 | 0 |
| +1 | −1 | +1 | −1 | +1 | −1 | +1 | −1 | −1 | +1 | −1 | +1 | 0 | 0 | 8 | 0 | 0 | 0 | 0 | 0 |
| +1 | +1 | +1 | −1 | +1 | +1 | +1 | −1 | +1 | −1 | −1 | −1 | 0 | 0 | 0 | 8 | 0 | 0 | 0 | 0 |
| +1 | −1 | −1 | +1 | +1 | −1 | −1 | +1 | +1 | −1 | −1 | +1 | 0 | 0 | 0 | 0 | 8 | 0 | 0 | 0 |
| +1 | +1 | −1 | +1 | +1 | +1 | −1 | +1 | −1 | +1 | −1 | −1 | 0 | 0 | 0 | 0 | 0 | 8 | 0 | 0 |
| +1 | −1 | +1 | +1 | +1 | −1 | +1 | +1 | −1 | −1 | +1 | −1 | 0 | 0 | 0 | 0 | 0 | 0 | 8 | 0 |
| +1 | +1 | +1 | +1 | +1 | +1 | +1 | +1 | +1 | +1 | +1 | +1 | 0 | 0 | 0 | 0 | 0 | 0 | 0 | 8 |

We have now to give some explanations in connection with the frequency. When $(f \sim f')$ is a half of the oscillation frequency $f$ of the parametron, the system according to the invention may be employed as the selector for writing in or reading out of a magnetic core memory device by means of the so-called $f \sim f/2$ method. In particulars for the storage of binary number "one" or "zero" on a magnetic core, and for reading out the binary number written in the core, the $f \sim f/2$ method has been proposed in which $f$ frequency current $i_f$ and $f/2$ frequency current $i_{f/2}$ are utilized. In this method, when $f$ frequency current has a zero phase, the positive peak magnitude of $i_{f+}i_{f/2}$ is larger than its negative peak magvertical wire 31 and a selected horizontal wire 32 can be written or read out without $f'+f=2f$ or $f'-f=2f$ affecting any of the remaining cores 33.

Such a parametron as above mentioned that oscillates only when required, is called "non-stationarily excited parametron," and may be utilized in many applications, and the present invention is particularly useful for exciting source for such a parametron.

The invention has been described particularly in connection with illustrated embodiments, but is never limited to such embodiments only. Various modifications and changes may be made within the spirits and scope of the invention as set forth in the appended claims.

We claim as our invention:

1. An electrical system controlled by a plurality of input signals for selecting a desired one out of a plurality of output circuits comprising, means for supplying a combination of input signals having a given frequency and one of both zero and $\pi$ phase positions, coding circuit means connected to receive the input signals from the first-mentioned means for generating under control of said input signals another combination of signals at least equal in number to the input signals and having the same frequency and one of both zero and $\pi$ phase positions in a combination different than the combination of input signals, frequency changing means operably coupled to the coding circuit for receiving all of said last-mentioned combination of signals for changing the frequency of all of said signals maintaining the respective phase positions unchanged, a plurality of output circuits comprising a plurality of output transformers comprising windings each directed in a given polarity sense, and means operably coupled to the frequency changing means for energizing said transformers by the last-mentioned signals in such a manner that a selected one only of said output circuits is energized to deliver an output signal having an energy level corresponding at least to the energy levels of all of the input signals combined and a phase position corresponding to a phase position of one of said last-mentioned signals.

2. An electrical system comprising, in combination, a register for delivering a first combination of a given number of input signals having phase angles corresponding to one of two opposite phases and a given frequency, a coding circuit operably connected to said register for receiving the input signals and having means energized thereby to deliver a second combination of signals corresponding to an increased number of coded signals having said given frequency and different phases corresponding to both of said phases, a frequency changing circuit operably connected to the coding circuit having means energized by said second-mentioned signals for delivering a corresponding number of signals as the coded signals and having a common frequency other than said given frequency and a different combination of the same respective phases, a multiple balance transformer operably coupled to the frequency changing circuit comprising a plurality of magnetic cores of linear characteristics, for each core a plurality of input coils each operably connected to receive a respective one of the last-mentioned signals, for each core an output coil inductively associated with the input coils thereon, the input coils and output coils each being directed in a given polarity sense and operably coupled to jointly effectively energize one only of the output coils alternatively in dependence upon particular phase combinations of said coded input signals and in a cumulative manner, and output connections on said output coils, whereby the output connection connected to the coil energized provides an output signal having an energy level corresponding substantially to at least the combined energy levels of the input signals and a phase position corresponding to the phase position of one of said coded signals.

3. An electrical system comprising, in combination, a register for delivering a first combination of a given number of input signals having phase angles corresponding to one of two opposite phases and a given frequency, a coding circuit operably connected to said register for receiving the input signals and having means energized thereby to deliver a second combination of signals corresponding to an increased number of coded signals having said given frequency and different phases corresponding to both of said phases, a frequency changing circuit operably connected to the coding circuit having means energized by said second-mentioned signals for delivering a corresponding number of signals as the coded signals and having a common frequency other than said given frequency and a different combination of the same respective phases, means coupled to the frequency changing circuit to apply currents thereto to control said common frequency and currents for delivering said different combination of the respective phases, a multiple balance transformer operably coupled to the frequency changing circuit comprising a plurality of magnetic cores of linear characteristics, for each core a plurality of input coils each operably connected to receive a respective one of the last-mentioned signals, for each core an output coil inductively associated with the input coils thereon, the input coils and output coils each directed in a given polarity sense and being operably coupled to jointly effectively energize one only of the output coils alternatively in dependence upon particular phase combinations of said coded input signals and in a cumulative manner, and output connections on said output coils, whereby the output connection connected to the coil energized provides an output signal having an energy level corresponding substantially to at least the combined energy levels of the input signals and a phase position corresponding to the phase position of one of said coded signals.

4. An electrical system comprising, a register for delivering a plurality of binary signals having a given frequency means coupled to the register energized by said signals for generating and including means for delivering an increased number of binary signals having another frequency, a plurality of output circuits comprising a multiple balance transformer energized by said second-mentioned binary signals for delivering a cumulative output signal to a selected one of said output circuits, said multiple balance transformer comprising a plurality of input coil groups coupled to the last-mentioned means corresponding in number to said second-mentioned binary signals, each group being formed by a plurality of coils corresponding in number to said second-mentioned binary signals, a plurality of magnetic cores corresponding in number to said second-mentioned binary signals, each core being inductively associated with a respective coil of said input coil groups, and an output coil on each of said magnetic cores, said input coils and output coils being directed in a given polarity sense so that particular combinations of said second-mentioned binary signals effectively energize a corresponding one only of said magnetic cores in a cumulative manner, thereby to develop in a corresponding output coil an output signal having an energy level corresponding to substantially the combined energy levels of the input signals and a phase angle corresponding to the phase angle of one of the second-binary signals.

5. An electrical system comprising, in combination, a register for supplying a plurality of signals having a given frequency and each representative of a binary number, a coding circuit operably connected to the register to receive the binary signals having said given frequency and some of which correspond to the first-mentioned binary signals, a frequency changer coupled to the coding circuit comprising a balance modulator having magnetic cores of non-linear characteristics and input coils wound on said cores receptive of said increased number of binary signals for generating binary signals equal in number to said increased number of signals and having a same frequency other than said given frequency, a multiple balance transformer having coils operably coupled to the frequency changer to receive the last-mentioned binary signals and directed in a given polarity sense for providing an output signal having an energy level corresponding to the combined energy level of said last-mentioned binary signals and a phase corresponding to one of the last-mentioned signals.

6. A selector system for writing in and reading out of a magnetic core memory device comprising, in combination with a magnetic core memory device, means comprising a plurality of resonators each having a given resonant frequency and characteristic output oscillation frequency for writing in and reading out of the memory device in response to selector signals corresponding to activating signals applied to the resonators for causing them to oscillate, selector means coupled to the resonators for applying selectively to a desired one only of said resonators a selector signal corresponding in frequency to said resonant frequency comprising, a multiple balance transformer having output coils operably connected to each of said resonators and input coils directed in a given polarity sense for applying a selector signal to a selected one only of said resonators alternatively in dependence upon given phase combinations and a selected frequency of certain input signals and for applying the selector signal as a sum of all of the input signals and means coupled to a multiple balance transformer for providing said input signals in selected phase combinations at a selected frequency corresponding to said resonant frequency to select which resonator is to write in to the memory device and read out of therefrom.

7. A selector system according to claim 6, in which each resonator is a parametron.

References Cited in the file of this patent

UNITED STATES PATENTS

| | | |
|---|---|---|
| 2,585,545 | Gannett | Feb. 12, 1952 |
| 2,709,757 | Triest | May 31, 1955 |
| 2,719,773 | Karnaugh | Oct. 4, 1955 |
| 2,734,184 | Rajchman | Feb. 7, 1956 |
| 2,770,739 | Grayson et al. | Nov. 13, 1956 |
| 2,795,706 | Barker | June 11, 1957 |
| 2,822,480 | Isborn | Feb. 4, 1958 |

FOREIGN PATENTS

| | | |
|---|---|---|
| 1,135,875 | France | Dec. 22, 1956 |